United States Patent
Lindsey et al.

(10) Patent No.: US 7,143,913 B2
(45) Date of Patent: Dec. 5, 2006

(54) GUN SAFE MOUNTED PERMANENTLY TO A SURFACE

(75) Inventors: Steve B. Lindsey, Murphy, TX (US); Bob W. Lakin, Richardson, TX (US); William D. Utzman, The Colony, TX (US)

(73) Assignee: Ryder Motorcycle Products, Inc., Addison, TX (US)

( * ) Notice: Subject to any disclaimer, the term of this patent is extended or adjusted under 35 U.S.C. 154(b) by 189 days.

(21) Appl. No.: 10/447,851

(22) Filed: May 29, 2003

(65) Prior Publication Data

US 2004/0238581 A1    Dec. 2, 2004

(51) Int. Cl.
B62J 7/00         (2006.01)
B65D 85/00        (2006.01)

(52) U.S. Cl. .............. 224/413; 206/317; 224/569; 224/912

(58) Field of Classification Search ............. 224/413, 224/276, 483, 543, 482, 569; 206/317, 85, 206/87, 268, 265, 379, 456, 470; 220/476, 220/478, 479, 4.22, 4.23, 475, 820; 70/63; 42/70.11; 109/49.66
See application file for complete search history.

(56) References Cited

U.S. PATENT DOCUMENTS

| | | | | |
|---|---|---|---|---|
| 2,706,036 A * | 4/1955 | Neal | ............ | 206/317 |
| 3,369,721 A * | 2/1968 | Lentz | ............ | 206/317 |
| 3,464,606 A * | 9/1969 | Nordeen | ............ | 224/281 |
| 3,625,405 A * | 12/1971 | Kezar et al. | ............ | 224/413 |
| 3,731,818 A * | 5/1973 | Young | ............ | 206/317 |
| 4,081,117 A * | 3/1978 | Crane | ............ | 224/441 |
| D310,304 S * | 9/1990 | Carmichael | ............ | D12/423 |
| 5,056,342 A * | 10/1991 | Prinz | ............ | 70/63 |
| 5,114,060 A * | 5/1992 | Boyer | ............ | 224/413 |
| 5,168,994 A * | 12/1992 | Beletsky et al. | ............ | 206/317 |
| 5,375,440 A * | 12/1994 | Patterson | ............ | 70/63 |
| 5,437,366 A * | 8/1995 | West et al. | ............ | 206/317 |
| D368,249 S * | 3/1996 | Ferrer | ............ | D12/423 |
| 5,701,770 A * | 12/1997 | Cook et al. | ............ | 70/63 |
| 5,829,586 A * | 11/1998 | Mermell | ............ | 206/317 |
| 6,000,592 A * | 12/1999 | Clanin | ............ | 224/413 |
| 6,082,601 A * | 7/2000 | Standish | ............ | 224/569 |
| 6,260,300 B1 * | 7/2001 | Klebes et al. | ............ | 42/70.11 |
| 6,354,476 B1 * | 3/2002 | Alderman | ............ | 224/413 |
| 6,405,861 B1 * | 6/2002 | Siler et al. | ............ | 206/317 |
| 6,513,689 B1 * | 2/2003 | Vincenzo | ............ | 224/435 |
| 6,570,501 B1 * | 5/2003 | Bushnell et al. | ............ | 340/542 |
| 6,601,680 B1 * | 8/2003 | Japchen | ............ | 190/120 |

* cited by examiner

*Primary Examiner*—Nathan J. Newhouse
*Assistant Examiner*—Justin M. Larson
(74) *Attorney, Agent, or Firm*—Michael L. Diaz

(57) ABSTRACT

A gun safe affixed to a surface such as a motorcycle for securely storing a gun. The gun safe includes a main body having an opening leading to an interior storage area. A planar surface area extends out from the main body. A cover covers the opening of the main body and the planar surface area. The cover may be hinged to the main body. The main body is preferably affixed to the surface by a plurality of bolts running through openings in the planar surface area and inserted into the motorcycle surface. A locking mechanism is utilized for locking the cover to the main body and the planar surface area. A gun is then stored in the gun safe and the locking mechanism locks the cover in a closed configuration to prevent unauthorized removal of the gun.

16 Claims, 4 Drawing Sheets

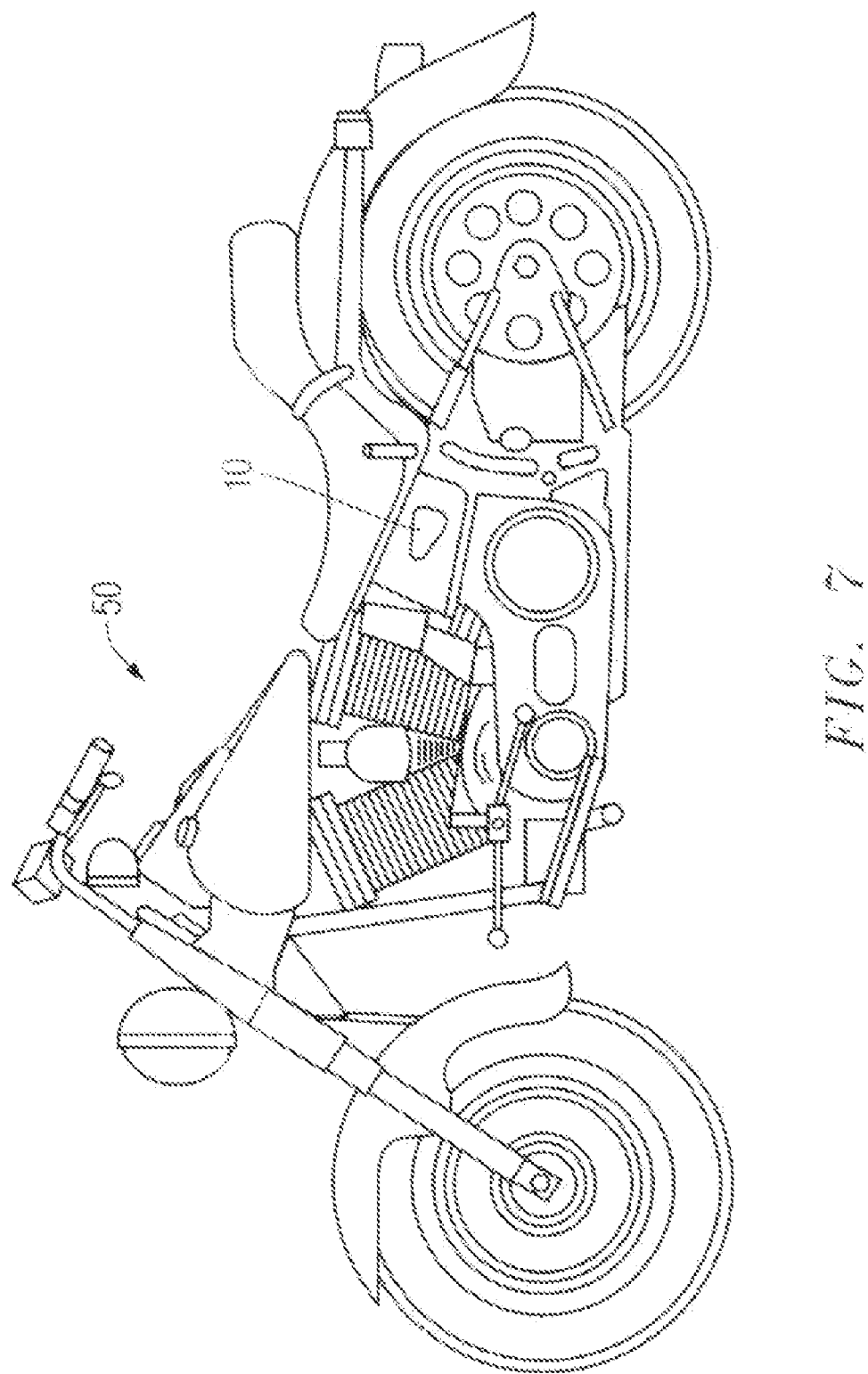

GUN SAFE MOUNTED PERMANENTLY TO A SURFACE

BACKGROUND OF THE INVENTION

1. Technical Field of the Invention

This invention relates to fire arms, and more particularly, to a gun safe permanently mounted to a fixed surface.

2. Description of Related Art

Many people in the United States own firearms for various reasons. Some people own firearms for protection, while others own firearms for hunting or other competitive activities. Special problems are encountered for those persons that carry or transport these firearms. If a person transports a firearm within a vehicle, in most localities, the firearm must be locked in a contained area, such as a trunk of a vehicle.

Additionally, the transportation of firearms while traveling on a motorcycle is particularly difficult due to the lack of secure space on the motorcycle. On a motorcycle, it is quite common for the rider to hide the firearm in a satchel or bag attached to the motorcycle. However, since the satchel or bag is easily breached by anyone, the rider typically removes the firearm from the hiding area and carries it with him. The task of carrying the weapon when leaving the motorcycle unattended is tedious and, at times, illegal (such as when carrying the firearm onto certain premises where carrying firearms are forbidden).

The carriage of firearms by commercial pilots has now been authorized. However, the firearm must be secured in a locked box within the cockpit. This locked box is portable, enabling the pilot to carry the firearm through the airport. Since the locked box is not secured to the cockpit, the pilot must remove the firearm from the aircraft when leaving the aircraft. Thus, existing devised lock boxes suffer from the disadvantage of not allowing the pilot to leave the firearm in the cockpit.

There are several different ways currently used to secure firearms. First, there are lock boxes where one may store the firearm with a lock, which may be opened by a key or a combination. The use of these lock boxes are especially useful at a person's home, but unsuitable for use on a motorcycle. Since the lock box, by its nature, is easily transportable, it also can be stolen quite easily.

Another way of securing a firearm is to lock the firearm in a storage area having a lock, such as a gun cabinet. But the use of gun cabinets are not possible on a motorcycle. There are also locks which are affixed directly to the gun which prevents the gun from being fired. However, these locks do not prevent the firearm from being stolen, but rather, merely prevents the discharge of the firearm.

A device is needed which properly secures a gun in a fixed location. The device must be securely fastened to a surface, such as a surface of a motorcycle. Thus, it would be a distinct advantage to have an apparatus which safely and efficiently stores the firearm on a motorcycle or in a cockpit of any aircraft. It is an object of the present invention to provide such a device.

BRIEF SUMMARY OF THE INVENTION

In one aspect, the present invention is a gun safe affixed to a surface for securely storing a gun. The gun safe includes a main body having an opening leading to an interior storage area. The main body is affixed to the surface. A planar surface area extends out from the main body. A cover covers the opening of the main body and the planar surface area. The gun safe also includes a locking mechanism for locking the cover to the main body and the planar surface area. The gun is positioned within the interior storage area and the cover covers the gun. The locking mechanism locks the cover in a closed configuration.

In another aspect, the present invention is a gun safe affixed to a surface of a motorcycle for securely storing a gun. The gun safe includes a surface integral to the motorcycle and a main body having an opening leading to an interior storage area. The main body is affixed to the motorcycle surface. A planar surface area extends out from the main body. A cover covers the opening of the main body and the surface area. In addition, the gun safe includes a locking mechanism for locking the cover to the main body and the planar surface area.

In still another aspect, the gun safe is affixed to a surface for securely storing a gun and includes a main body having an opening leading to an interior storage area. The main body is affixed to the body by a plurality of bolts running through openings in a planar surface area extending out from the main body. The bolts are inserted into the surface. In addition, the gun safe includes a locking mechanism for locking the cover to the main body and the planar surface area. The interior of the gun safe may be coated with a rubberized matting to protect the gun.

BRIEF DESCRIPTION OF THE SEVERAL VIEWS OF THE DRAWINGS

The invention will be better understood and its numerous objects and advantages will become more apparent to those skilled in the art by reference to the following drawings, in conjunction with the accompanying specification, in which:

FIG. 7 is a side view of the gun safe affixed to a motorcycle.

DETAILED DESCRIPTION OF THE INVENTION

Figure 1:
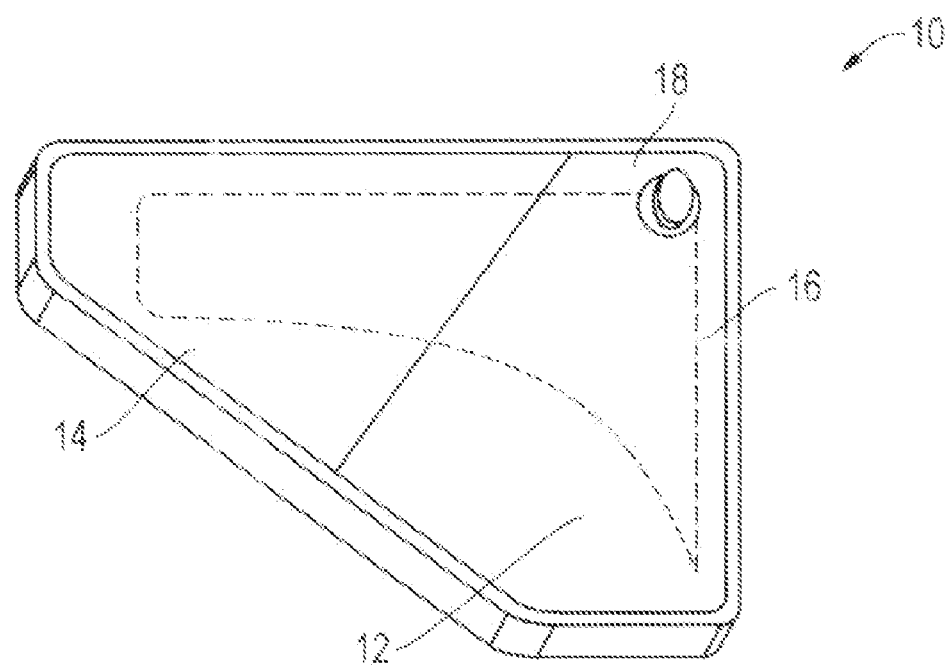
FIG. 1 is a top view of a gun safe storing a gun in the preferred embodiment of the present invention.
Figure 2:
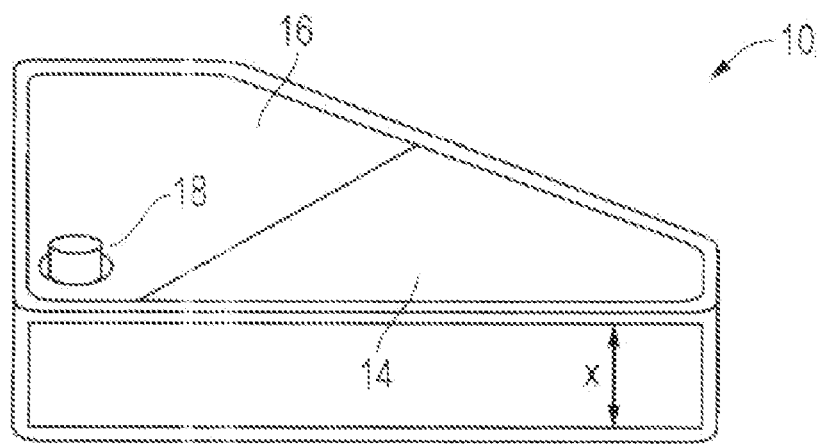
FIG. 2 is a front perspective view of the gun safe of FIG. 1 in a closed configuration.
Figure 3:
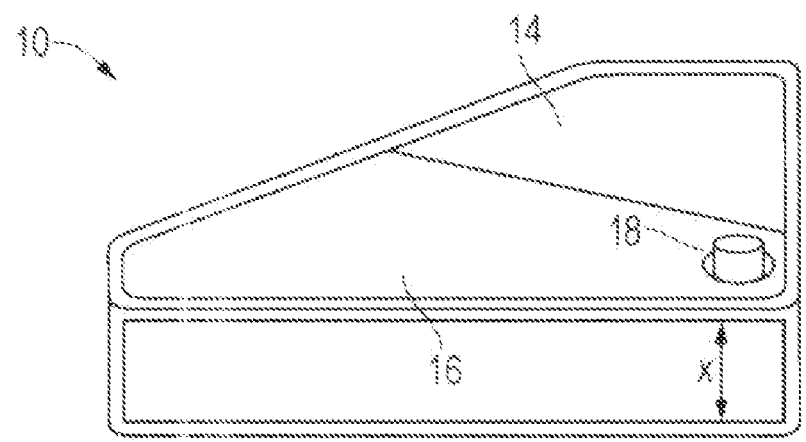
FIG. 3 is a side perspective view of the gun safe in a closed configuration.

A gun safe permanently affixed to a surface is disclosed. FIG. 1 is a top view of a gun safe 10 storing a gun 12 in the preferred embodiment of the present invention. The gun safe includes a main body 14 and a hinged cover 16. Upon the hinged cover is a lock 18. The lock may be any locking device, such as a key or combination lock. As illustrated in FIG. 1, the lock is a lock openable by a key. In the preferred embodiment of the present invention, the gun safe is sized and shaped to conform to a conventional handgun. However, in alternate embodiments of the present invention, the gun safe may be in any size and shape to accommodate any type of firearm, such as a rifle or shotgun. In addition, the gun safe is constructed of a rigid, durable material. Preferably, the material is strong enough to prevent a forced entry into the gun safe, such as tempered steel. FIG. 2 is a front perspective view of the gun safe 10 of FIG. 1 in a closed configuration. The gun safe has a depth X large enough to accommodate the gun 12. FIG. 3 is a side perspective view of the gun safe 10 in a closed configuration.

Figure 4:
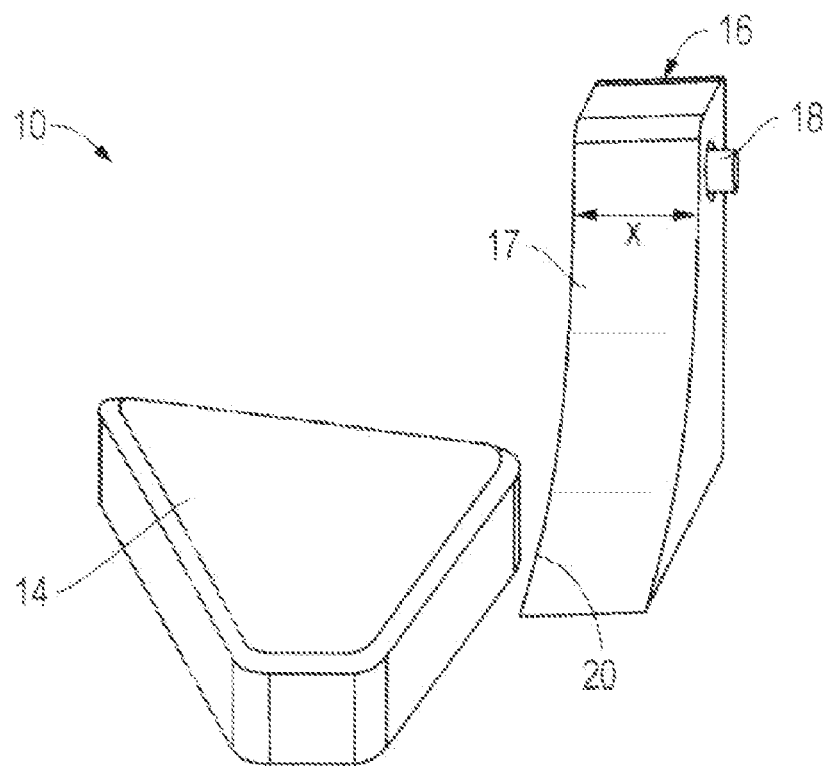
FIG. 4 is a side perspective view of the gun safe in an opened configuration.

FIG. 4 is a side perspective view of the gun safe 10 in an opened configuration. The hinged cover 16 may be swung open in doorlike fashion about a hinge 20 affixed to a portion of the main body 14. Preferably, the hinge is positioned on an inner portion of the main body to prevent removal of the hinged cover from the main body. In an alternate embodiment of the present invention, the hinged cover may be removable from the main body.

Figure 5:
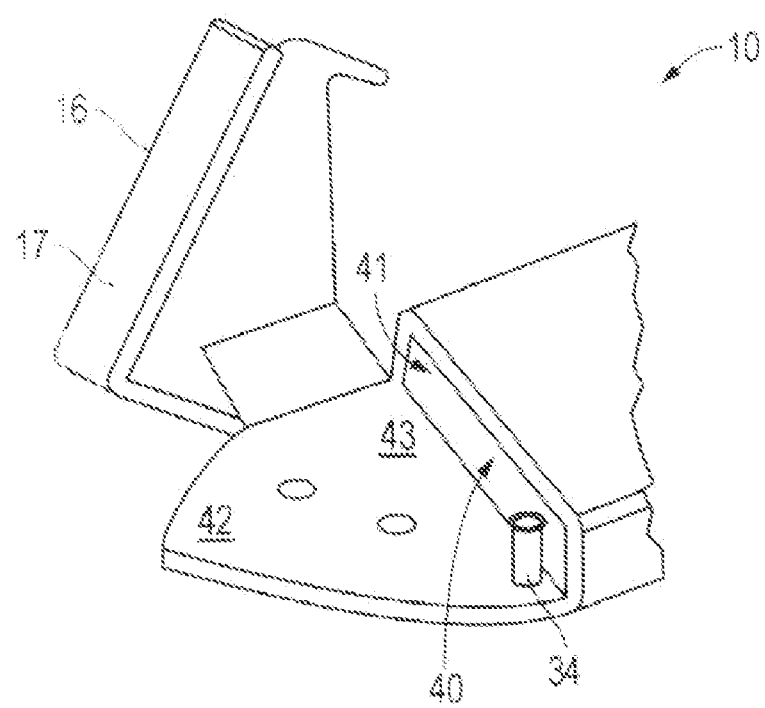
FIG. 5 is a front perspective view of the gun safe in an opened configuration.
Figure 6:
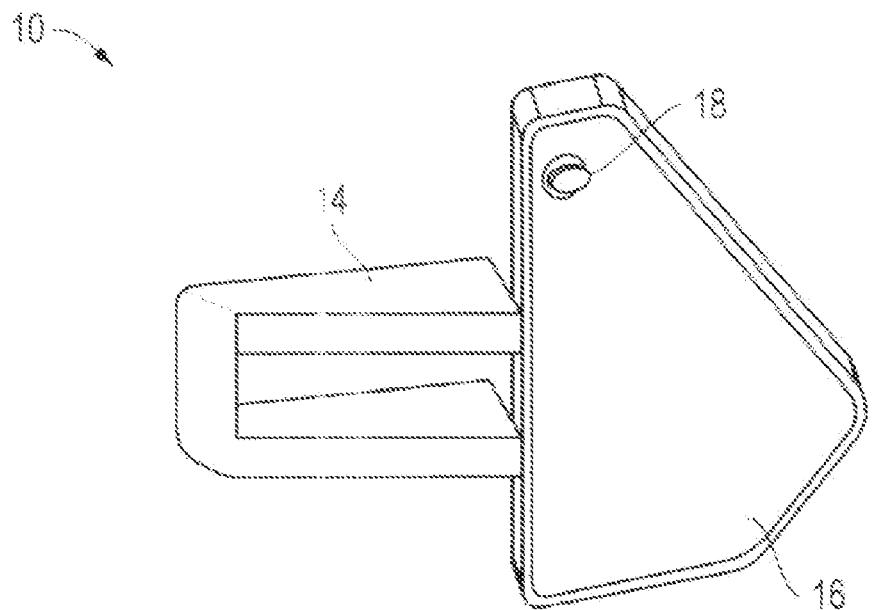
FIG. 6 is a rear perspective view of the gun safe in an opened configuration.

FIG. 5 is a front perspective view of the gun safe 10 in an opened configuration. FIG. 6 is a rear perspective view of the gun safe 10 in an opened configuration. Integral to the main body is a planar surface area 30. Upon the planar surface area 30 is a plurality of openings 32 and a lock striker plate 34. The main body includes an opening 40 having an area large enough to accommodate a barrel of the gun 12. The lock striker plate is aligned with the lock 18 so that when the hinged cover 16 is in the closed configuration, a portion of the lock 18 located on the inside of the hinged cover rests upon the striker plate, thereby locking the hinged cover in the closed position.

An inner surface 41 of the main body 14, the hinged cover 16, and the planar surface area 30 may be layered with a rubberized matting 42 to protect the gun 12 from any direct contact with the gun safe, thereby preventing damage to the gun. The inner surface 41 and the planar surface 30 form a flat contact surface 43 which is affixed to a surface (e.g., motorcycle surface). The hinged cover 16 includes a downward wall 17 originating from an edge of the cover. The downward wall contacts the planar surface 30 when in the closed configuration.

Bolts (not shown) may be inserted through the openings 32. The bolts may pass through the openings and into a fixed planar surface area, such as a motorcycle or an inner wall of a cockpit. The bolts enable the gun safe to remain in a fixed position and prevent the theft of the gun safe and its contents. When the hinged cover 16 is closed, the inside of the gun safe where the bolts are located is not accessible. Therefore, the bolts cannot be removed without opening the hinged cover. It should be understand by those skilled in the art that any mechanism may be utilized which securely fastens the gun safe to a fixed surface.

FIG. 7 is a side view of the gun safe 10 affixed to a motorcycle 50. The gun safe may be affixed to any surface of the motorcycle. Bolts (not shown) may be positioned through the openings 32 into a surface of the motorcycle. The gun 12 is stored in the gun safe by positioning the barrel of the gun into the opening 40 of the main body 14. The hinged cover 16 is then rotated to the closed position to secure the gun in the gun safe.

With reference to FIGS. 1–7, the operation of the gun safe 10 will now be explained. The gun safe is affixed to a desired surface, such as a fixed surface of a motorcycle or inner cockpit wall of an aircraft. The gun safe is secured to the surface by preferably attaching bolts through the openings 32 into the fixed surface. The bolts can only be accessed by opening the hinged cover 16. When desired, the gun is positioned within the gun safe by inserting the barrel of the gun into the opening 40 leading to an interior area of the main body 14. The gun rests within the gun safe in the same manner that a guns rests in a gun holster. The hinged cover is then closed and locked by the lock 18. Access to the interior of the gun safe is gained by unlocking the lock 18 and rotating the hinged cover to the open position.

With the gun safe in the closed position, the gun stored within the gun safe is secured. The gun cannot be taken without opening the hinged cover 16. The hinged cover is configured so that in the closed position, the junctions between the surfaces of the gun safe are flush. Having the surfaces of the gun safe flush prevents someone from forcing the gun open with a crowbar. Additionally, the gun safe cannot be removed from the fixed surface (motorcycle or inner wall of the cockpit) without opening the hinged cover. Alternatively, the gun safe may be affixed to any surface, such as a motorized vehicle or a fixed surface.

The present invention provides many advantages over existing devices. The gun safe provides a storage container which is affixed to a desired surface in such a manner that the gun safe cannot be removed without opening the gun safe. The gun safe is constructed of a material that prevents the forced entry into the interior of the gun safe. The gun safe is small enough to be affixed to a fixed surface having a small surface area.

It is thus believed that the operation and construction of the present invention will be apparent from the foregoing description. While the device shown and described has been characterized, as being preferred, it will be readily apparent that various changes and modifications could be made therein without departing from the scope of the invention as defined in the following claims.

What is claimed is:

1. A gun safe affixed to an attachment surface for securely storing a gun, said gun safe comprising:
    a main body having an opening leading to an interior storage area, the interior storage area having an inner surface;
    a planar surface area extending out from the inner surface of said main body, the planar surface area and inner surface area forming a flat contact surface;
    the flat contact surface being immobile and affixed to the attachment surface;
    a cover covering the opening of said main body and said planar surface area, said cover hinged to the planar surface area and having a downward projecting wall originating from an edge of the cover that is not hinged to the planar surface and contacts the planar surface area when in a closed configuration;
    said main body affixed to the attachment surface by a plurality of bolts running through openings in said planar surface area and inserted into the attachment surface; and
    a locking mechanism for locking said cover to said main body and said planar surface area;
    the interior storage area remaining immobile and fixed to the inner surface;
    whereby the gun is positioned immobile within the interior storage area and said cover covers the gun and said locking mechanism locking said cover in a closed configuration.

2. The gun safe of claim 1 wherein:
    the interior storage area is sized and shaped to receive only a barrel of the gun; and
    the cover and the planar surface area cover are sized and shaped to cover a remaining exposed portion of the gun;
    whereby the gun barrel is positioned within the interior storage area and the cover covers the remaining exposed portion of the gun in the closed configuration.

3. A gun safe affixed to a surface of a motorcycle for securely storing a gun, said gun safe comprising:
    a surface integral to the motorcycle;

a main body having an opening leading to an interior storage area, the interior storage area having an inner surface;

a planar surface area extending out from the inner surface of said main body, the planar surface area and inner surface area forming a flat contact surface;

the flat contact surface being immobile and affixed to the motorcycle surface;

a cover covering the opening of said main body and said surface area, said cover hinged to the planar surface area and having a downward projecting wall originating from an edge of the cover that is not hinged to the planar surface and contacts the planar surface area when in a closed configuration; and a locking mechanism for locking said cover to said main body and said planar surface area;

the interior storage area remaining immobile and fixed to the inner surface;

whereby the gun is positioned within the interior storage area and said cover covers the gun and said locking mechanism locking said cover in a closed configuration.

4. The gun safe of claim 3 wherein a matting is applied to an interior surface of said main body, said cover, and said planar surface area.

5. The gun safe of claim 3 wherein said gun safe is affixed to the surface by a plurality of bolts running through openings in said planar surface area and inserted into the motorcycle surface.

6. The gun safe of claim 5 wherein the plurality of bolts are only removable with said cover in an open configuration.

7. A gun safe affixed to an attachment surface for securely storing a gun, said gun safe comprising:

a main body having an opening leading to an interior storage area, the interior storage area having an inner surface;

a planar surface area extending out from the inner surface of said main body, the planar surface area and inner surface area forming a flat contact surface;

the flat contact surface being immobile and affixed to the attachment surface;

a cover covering the opening of said main body and said planar surface area, said cover hinged to the planar surface area hinged to the planar surface area and having a downward projecting wall originating from an edge of the cover that is not hinged to the planar surface and contacts the planar surface area when in a closed configuration; and a locking mechanism for locking said cover to said main body and said planar surface area;

the interior storage area remaining immobile and fixed to the inner surface;

whereby the gun is positioned within the interior storage area and said cover covers the gun and said locking mechanism locking said cover in the closed configuration.

8. The gun safe of claim 7 wherein a barrel of the gun is positioned within the interior storage area.

9. The gun safe of claim 7 wherein the cover lies flush against said planar surface area and said main body in the closed position.

10. The gun safe of claim 7 wherein said locking mechanism is opened by a key.

11. The gun safe of claim 7 wherein said main body is attached to the surface of a motorcycle.

12. The gun safe of claim 7 wherein said main body is attached to the surface located within an aircraft cockpit.

13. The gun safe of claim 7 wherein a matting is applied to an interior surface of said main body, said cover, and said planar surface area.

14. The gun safe of claim 13 wherein said matting is rubberized.

15. The gun safe of claim 7 wherein said gun safe is affixed to the attachment surface by a plurality of bolts running through openings in said planar surface area and inserted into the attachment surface.

16. The gun safe of claim 15 wherein the plurality of bolts are only removable with said cover in an open configuration.

* * * * *